United States Patent [19]
> Mori et al.

[11] 4,340,149
[45] Jul. 20, 1982

[54] LINED CLOSURE
[75] Inventors: Fumio Mori, Yokohama; Gunji Matsuda, Isehara; Toshihiko Yoshida; Shigeru Nagashima, both of Hiratsuka, all of Japan
[73] Assignee: Toyo Seikan Kaisha, Ltd., Tokyo, Japan
[21] Appl. No.: 201,608
[22] Filed: Oct. 28, 1980

Related U.S. Application Data
[63] Continuation of Ser. No. 59,196, Jul. 20, 1979, abandoned.

[30] Foreign Application Priority Data
Jul. 22, 1978 [JP] Japan ................................. 53-88954
[51] Int. Cl.³ ............................................. B65D 53/06
[52] U.S. Cl. ................................................... 215/343
[58] Field of Search ......................... 215/341, 343, 349

[56] References Cited
U.S. PATENT DOCUMENTS
3,135,019 6/1964 Aichele .
3,195,754 7/1965 Brockett ......................... 215/343 X
3,696,956 10/1972 Merrill ............................... 215/343

Primary Examiner—Donald F. Norton
Attorney, Agent, or Firm—Sherman & Shalloway

[57] ABSTRACT

A cap adapted for use as a container cover where the cap has a thermoplastic resin liner pressed formed onto the inner surface of a cap shell. The plastic liner is formed such that the difference between the intrasurface orientation index of the outer peripheral portion of the liner and the intrasurface orientation index of the central portion of the liner does not exceed 0.37 where the intrasurface orientation index is defined as the sum of the orientation coefficient of the liner in the radial direction and the orientation coefficient of the liner in the circular direction.

A method of making a cap having a thermoplastic liner where the liner is press-formed into shape under conditions whereby the difference between the intrasurface orientation index of the outer peripheral portion of the liner and the orientation index of the central portion of the liner does not exceed 0.37.

5 Claims, 12 Drawing Figures

FIG. 10-A
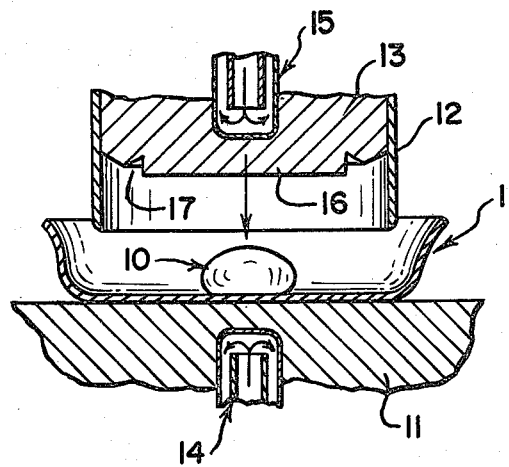
FIG. 10-B
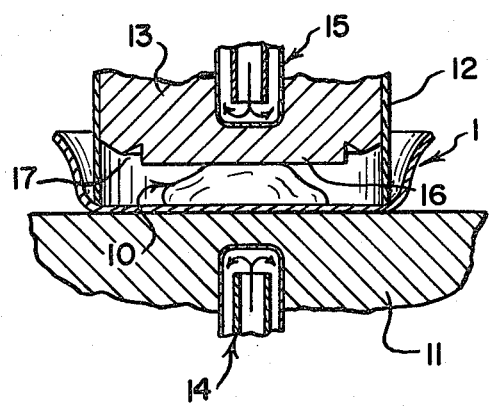
FIG. 10-C
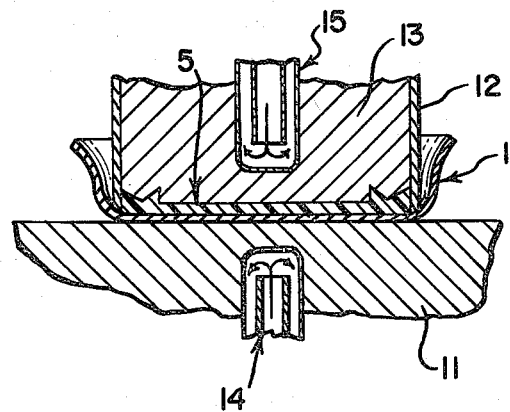

LINED CLOSURE

CROSS-REFERENCE TO OTHER APPLICATIONS

This application is a continuation of our copending application Ser. No. 59,196 filed July 20, 1979, now abandoned.

TECHNICAL FIELD

The present invention relates to a cap and its method of manufacture having a liner of superior resistance to stress cracking including cracking under environmental conditions. In particular, the invention relates to a liner of a thermoplastic resin which is formed by compression on an inside surface of a cap shell, with the result that sealability, peeling resistance and the long term sealability after heat treatment of the cap are markedly improved.

BACKGROUND ART

Various types of container covers in shapes such as crowns or caps, furnished with liners or packings such as various rubbers, resins, paper or cork have been widely used in the past. Caps having liners comprising low density polyethylene and vinyl chloride resin have been gradually coming into widespread use since such liners are easily formed, have superior sealability, protect the flavor of the contained beverages, and have low production costs.

One method of manufacturing caps having liners is disclosed in Japanese patent application Publication No. 41-5588 (1966) and comprises the step of supplying a piece of molten thermoplastic resin to the inner surface of a cap shell and the step of pressing the piece between the shell body and a cooled press to form the liner shape. A further method is disclosed in Japanese patent application Publication No. 48-5706 (1973) where the thermoplastic resin is supplied as a prepared form to the inner surface of the cap shell after which the form is softened by heating the shell. The form is then pressed between the cap shell and a cooled press to form the liner shape.

It is necessary that the liner of a cap engage with a container mouth in a tightly sealed manner, and consequently the outer periphery of the liner that engages with the container mouth should be furnished with one or more ring-shaped projections or with a concave channel.

Prior methods of press forming a liner have the advantage of simultaneously forming the liner shape from the piece of thermoplastic resin and sealing the liner to the container cover shell. However, the sealing performance of press formed liners has in many instances been inferior to that of prepared form disc-shaped liners punched from liner sheets. This is due in part to such factors as the compressive force applied to the liner, contact with the contained product or the vapor of the contained product and the temperatures applied during sterilization, all of which may cause microcracks to form in the liner and particularly on the peripheral portion of the liner which is the most important portion from a sealing function. The tendency for formation of this sort of cracking increases as the compression forming of the liner is carried out at greater speed and as annular projections and concave channels are formed for more effective dimensioning of the liner periphery.

Thus, caps furnished with press formed resin liners, in spite of the fact that the resin itself has an essentially superior performance, have not in all instances shown satisfactory sealability, liner anti-peelability or long-term sealability after heat treatment.

It is therefore an object of the present invention to provide for a cap having a press formed resin liner and a method of manufacturing the same where the liner has superior stress cracking resistance properties, under environmental conditions, under compressive forces received by the resin liner during sealing, under contact with the contents of containers or their vapors and under high temperature applied to the contents during sterilization.

A further object of the present invention is to provide for a press formed resin lined cap and a method of manufacturing the same where the cap has a superior combination of sealability, liner peeling resistance and long-term sealability after heat treatment than prior art caps.

Still another object of the present invention is to provide for a resin lined cap and a method of manufacturing the same where stress cracking is effectively prevented in caps having ring-shaped projections and/or concave channels which are formed at the outer periphery of the liner where it contacts a container opening.

Yet another object of the present invention is to provide for a resin lined cap where the diameter of the cap is comparatively large and where a piece of thermoplastic resin used as a liner is applied inside the cap shell in a comparatively small amount, and where stress cracking is effectively prevented even in cases when the piece of resin is pressed and expanded to a comparatively large diameter.

A further object of the present invention is to provide for a resin lined cap where stress cracking is prevented even in cases where the liner shape is formed from a piece of resin at high speeds.

DISCLOSURE OF INVENTION

Broadly the invention comprises a cap having a thermoplastic liner which is press-formed onto an inside bottom surface of a cap shell. The press forming of the liner is done under conditions such that the difference between the intrasurface orientation index of the outer peripheral portion of the liner and the intrasurface orientation index of the central portion of the liner does not exceed 0.37 where the intrasurface orientation index is defined as $l+m$ and where $l$ represents the orientation coefficient in the radial direction of the liner and $m$ represents the orientation coefficient in the circular direction of the liner. $l$ as used hereinafter in the Tables in connection with the description of the invention is represented by the character $l$.

Preferably the difference between the balance degree of the liner at its outer peripheral portion and the balance degree of the liner at its central portion should not exceed 0.3 where balance degree is defined as $l-m$.

Further it is preferable in those instances where the cap liner is to have projecting rings forming a groove on its peripheral portion adapted to engage the open end of a container, that the projections have a thickness 2 to 20 times the thickness of the thin central portion of the liner.

In addition the liner itself should comprise an olefin resin and preferably a low density polyethylene having at least one enhancing ingredient added thereto selected from a group comprising an ethylene-propylene copolymer and a styrene-diene-styrene block copolymer in amounts of 3–40 wt/% of the low density polyethylene. It is also advantageous that the low density polyethylene have a melt index of 1.0 to 20 g/10 minutes.

The cap is produced by a method including the steps of supplying the resin to the inner surface of the cap in a heated or molten state and then pressing the resin into the desired liner shape under conditions to give the desired difference in the intrasurface orientation indices as outlined above and preferably the desired difference balance degrees as also outlined above.

BEST MODE FOR CARRYING OUT THE INVENTION

Figure 1:
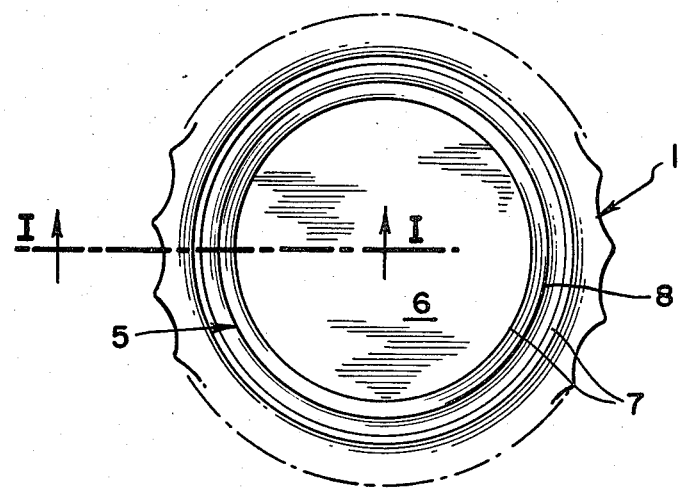
FIG. 1 is a plan view illustrating the inside of a cap constructed according to the invention.
Figure 2:
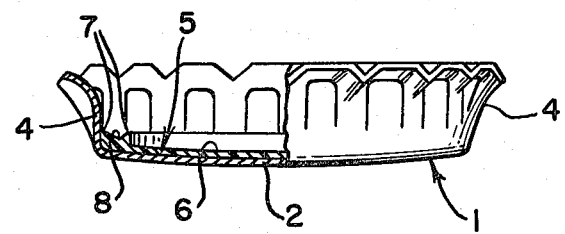
FIG. 2 is a partial sectional side view of the cap of FIG. 1 taken along lines I—I.

Referring to FIGS. 1 and 2, a cap is illustrated constructed according to the invention which is adapted to cover and seal an open end of a container and where the cap comprises a crown shell 1 having a top sheet 2 and a skirt 4 including a plurality of pleats. A thermoplastic resin liner 5 is positioned on the inner bottom surface of the sheet and is formed by press forming in place inside the shell. The liner has a comparatively thin central part 6 and comparatively thick ring-shaped projections 7 and 7 provided on the outer peripheral part that are adapted to engage with a bottle mouth. In this embodiment of the invention, a ring-shaped concave channel 8 is formed between the ring projections 7 and 7. Liner 5 is thermally adhered to the inside bottom surface of the shell 1 by means of a thermal adhesion paint layer (not illustrated) at the same time as the liner is press-formed.

In the cap of the present invention, it is very important that the intrasurface orientation characteristic value of the liner 5, that is the difference $(I_o^P - I_o^C)$ between the value $(I_o^C)$ of the central part of the liner and the value $(I_o^P)$ of the peripheral part of the liner be 0.37 maximum, preferably 0.27 maximum, and most preferably 0.15 maximum, in order to completely prevent stress cracking. The intrasurface orientation index referred to herein is defined by the following equation:

$$I_o = l + m \tag{1}$$

where $l$ is the orientation coefficient of the liner surface in the radial direction and $m$ is the orientation coefficient of the liner surface in the circular direction.

This two dimensional direction orientation coefficient, as stated in Yasunori Nishijima, Kobunshi (High Polymers), vol. 15, No. 175, page 868 (Kobunshi Gakkai (Society of Polymer Science), 1966), is obtained from methods that utilize the optical anisotropy of fluorescent molecules to determine, qualitatively and quantitatively, the molecular orientation accompanying the solid deformation of high molecules that comprise thermoplastic resins, or the orientation form or orientation degree of molecular orientation during streaming in the molten state. Considering the intrawall two dimensional orientation of the final liner of the present invention following the content of the work cited, the orientation coefficient can be shown quantitatively by the following formula:

$$I_{\parallel}(\omega) = \kappa\phi(l\cos^4\omega + m\sin^4\omega + \tfrac{2}{3}n) \tag{2}$$

$I_{\parallel}(\omega)$ shows the polarized component strength of the fluorescence generated from the thermoplastic resin being tested, $\parallel$ indicating the fact that the photometric polarization direction and the oscillation direction of the incident polarization are parallel. $\omega$ shows the angle of rotation of the sample against the oscillation direction of the polarization. $\kappa$ shows the maximum excitation probability when the oscillation direction of the excitation fluorescence and the sample molecular axis are parallel, and $\phi$ shows the molecular fluorescence contraction. $l$ is the proportion of molecules oriented in the radial direction in the final liner wall surface, $m$ is the proportion of molecules oriented in a circular direction in the final liner at right angles to $l$, $n$ is the proportion of intrasurface non-orientation and $l + m = 1$.

With prior methods of manufacturing lined caps, the piece of molten thermoplastic resin was pressed by a cooled press such that the piece was spread and formed into the prescribed shape. In this regard, the surface of the liner coming into contact with the press necessarily received intrasurface orientation from plastic deformation, and the degree of this intrasurface orientation was markedly larger in the peripheral parts of the liner than in the central part where the degree of deformation was smaller. This was particularly true when forming ring-shaped projections on the periphery of the liner which were adapted to engage with a bottle mouth. In order to carry out the forming of these projections with accuracy and precision, it was necessary that the press be forcibly cooled with a low temperature coolant such as chilled water, that the compression speed of the press be as fast as possible, and that the surface shape of the liner correspond accurately with that of the press. Because of these factors, there was a tendency for the degree of intrasurface orientation in the peripheral parts of the liner to be large.

Liners having large differences between the intrasurface orientation index value for the liner center and for the liner periphery, as will be shown by comparative examples hereafter, may not have cracks initially but when given accelerated crack resistance tests, cracks will appear in a very short time and when given environmental heat resistance tests, cracks will form to a very high degree under simultaneous conditions of compressive force, contact with container contents and temperature.

The present invention reduces cracking as described above by controlling the intrasurface orientation of the entire surface of the liner such that the difference between the value of the intrasurface orientation index for the liner periphery ($I_o^P$) and the value for the liner center ($I_o^C$) is kept at 0.37 maximum. Control of the intrasurface orientation in the liner periphery results in the time period for 50% cracking being lengthened five-fold or more when compared in accelerated cracking tests with prior products and results in no crack formation in actual bottle environmental heat resistance tests.

Stress cracking of the liner, in addition to being closely related to the intrasurface orientation characteristics described above, has also been found to be related closely to the balance degree ($D_B$) as shown by the following equation.

$$D_B = l - m \tag{3}$$

where l is the orientation coefficient of the liner in the radial direction, and m is the orientation coefficient of the liner in the peripheral or circular direction.

When enlargement or spreading of the resin occurs in the radial direction under forced cooling conditions, the orientation of the resin in the radial direction is much greater than the orientation in the peripheral direction, and this orientation in the radial direction has a tendency toward stress cracking in the peripheral parts of large liners.

Following the present invention, the difference ($D_B^P - D_B^C$) between the balance degree in the liner periphery ($D_B^P$) and the balance degree in the liner center ($D_B^C$) should be 0.3 maximum, and preferably 0.25 maximum, from the standpoint of stress cracking resistance.

The present invention is useful when the liner has at least one ring-shaped projection adapted for sealing the liner periphery with a container mouth and when this projection is 2 to 20 times the thickness of the thin part of the liner center and especially when the projection is 4 to 10 times the thickness of the center part. Stress cracking has a tendency to occur to a great degree in press-formed liners having projections as described above because in order to bring about the flow of resin from the center part to the projection, a very high degree of orientation in the radial direction occurs.

Following the present invention, it is possible to control this tendency for stress cracking completely by relaxing the radial orientation in the peripheral portion of the liner.

In order that the intrasurface orientation index characteristic value ($I_o^P - I_o^C$) will not exceed 0.37 maximum, that is in order to control the intrasurface orientation of the liner periphery, at least one of the following conditions should be used.

(1) To prevent orientation accompanying abrupt cooling of the resin, the temperature of the molten resin is made as high as possible. In order to accomplish this, the resin is maintained below its solution temperature and at least 70° C., and preferably at least 100° C., above its melting or softening point.

(2) The molecular orientation of the entire liner surface is controlled by maintaining the surface temperature of the press lower than the melting point or softening point of the resin but still as high as possible during the pressing period. To accomplish this, the surface temperature of the press is maintained at between 20° C. minimum and 40° C., and at least 5° C. lower than the melting or softening point of the resin.

(3) Formation of orientation in the peripheral part of the liner is relaxed by forced cooling of only the part of the press corresponding to the liner center and keeping the temperature of the press surface corresponding to the periphery of the liner at a higher temperature. To accomplish this, the temperature difference should be such that the temperature of the press where it corresponds to the liner periphery is at least 20° C., and preferably 40° C.

(4) The cap shell is preheated to a temperature higher than the melting point or softening point of the resin.

(5) The surface temperature of an anvil used in conjunction with the press to support the shell and to press-form the molten resin is maintained between 20° C. minimum and preferably 40° C., and at least 5° C. lower than the melting point or softening point of the resin.

(6) Pressing is done at high speed to expand and stream the resin in a molten state. To accomplish this, the drop of the press is 100 milliseconds maximum, and preferably 50 milliseconds maximum.

(7) The compressive force of the press is kept to a comparatively small pressure, ordinarily 50 kg/cm² maximum, and particularly 20 kg/cm² maximum since the proportion of molten resin and the proportion of resin solids are ordinarily large.

(8) Decreasing the orientation in the peripheral part of the liner is effective in raising the expansibility and streamability of the resin in the molten state, and to accomplish this, as for example in the case of low density polyethylene, a resin of comparatively high melt flowability (melt index) is used.

(9) An orientation inhibiting ingredient is included in the resin in order to inhibit the orientability of the resin that will comprise the liner. For example, in the case of low density polyethylene, blends are made with elastomers or thermoplastic elastomers.

When using only one of these conditions is not sufficient for controlling the intrasurface orientation of the liner, then two or more of these conditions may be used in combination. The conditions for controlling the intrasurface orientation in the liner periphery are very diverse as described above and consequently it is difficult to specify specific conditions in complete detail. In brief, with the present invention it is possible to select any of the desired conditions as long as the conditions for pressing with the press are such that the intrasurface orientation index characteristic value ($I_o^P - I_o^C$), and further the balance degree characteristic value ($D_B^P - D_B^C$) come within the ranges stated previously.

The process for producing a cap of the present invention is best illustrated in FIGS. 10A, 10B and 10C. As shown piece 10 of a molten resin is supplied through a die of an extruder and a rotary cutter (both not shown) to the inside of cap shell 1. Before supplying the piece 10, shell 1 can be preheated by means such as high frequency induction heater. Instead of supplying a piece of heated resin, it is also possible to supply a piece of solidified resin or a piece of resin preheated to a temperature lower than the melting temperature into shell 1, and then heat the shell and resin by means of an electric heater, induction heater or an oven to melt or soften the resin.

Piece 10 should be in a state where it is temporarily adhered in shell 1.

Shell 1 having the piece of molten resin is then moved to the pressing station and while shell 1 is supported by an anvil 11, press 13 and sleeve 12 positioned above the shell drop down such that the press engages the piece of resin. Anvil 11 has a cooling device 14 furnished in its central part corresponding to the center of the liner and the central part of press 13 corresponding to the center of the liner has a cooling device 15. A central surface part 16 is formed on the surface of the press and has a flat and/or smoothly curved surface for forming the thin part of the liner. A peripheral ring-shaped concave part 17 for forming the ring projection of the liner is on the outer periphery of the press 13.

As shown in FIG. 10B, sleeve 12 first engages with the inner periphery of the skirt of shell 1, and after shell 1 is firmly fastened by the sleeve, press 13 falls rapidly to begin pressing the molten piece of resin. The molten resin piece 10 is then expanded or spread rapidly in the radial direction and the forming of the liner shape is rapidly accomplished. At this time, following the present invention, by using at least one of the conditions (1) to (9), the intrasurface orientation of at least the liner periphery is markedly controlled. Further, the air present between press 13 and shell 1 is exhausted to the outside through the interstices between press 13 and sleeve 12.

As shown in FIG. 10C, the piece of molten resin is press-formed into liner 5 exactly as prescribed and at the same time, liner 5 is thermally adhered to shell 1. Liner 5 is held in this pressed condition for a fixed period of time during which the entire liner body is gradually cooled by cooling mechanisms 14 and 15 emplaced in anvil 11 and press 13 so as to produce a hardened liner. Sleeve 12 and press 13 are then raised to obtain a cap furnished with press-formed liner 5.

Ordinary tap water can be effectively used to cool the press and the anvil, but other coolants such as gases or liquids can also be used.

The metal comprising the cap shell of the present invention will ordinarly be a metal foil in the range of 1 to 100 microns thick, preferably 5 to 100 microns thick, or a metal sheet 100 microns or more in thickness. There are no particular restrictions as to types of metals used, those used being for example foil or sheets of surface untreated steel (black plate), surface treated steel, or light metals such as aluminum. Suitable examples of surface treated steel are steels in foil or sheet form whose surfaces have been by chemical treatments such as sulfuric acid treatment or chromic acid treatment, electrolytic treatment such as electrolytic chromic acid treatment and electric tin plating, and melt plating treatment such as melt tin plating treatment.

The surfaces of these metals should also be given one or two layers or more of a protective paint and a thermally adhesive undercoating paint for the liner. Examples of suitable protective paints are one or combinations of two or more of phenol-epoxy paint, epoxy-urea paint, epoxy-melamine paint, phenol-epoxy-vinyl paint, epoxy-vinyl paint, vinyl chloride-vinyl acetate copolymer paint, vinyl chloride-vinyl acetate-anhydride maleic acid copolymer paint, unsaturated polyester paint and saturated polyester paint. In cases when the protective paint itself does not have adhesion to the thermoplastic resin used for the liner, a thermally adhesive paint for the liner can be applied directly on the metal material or on the protective paint. For example, when the lining resin is an olefin resin, it is possible to use paint where a known olefin resin thermally adhesive paint, for example polyethylene oxide and acid modified olefin resin are dispersed in a coat forming olefin resin. On the other hand, when the lining resin is a vinyl chloride resin, the vinyl resin paint and vinyl resin modified paint can be used.

Coated metal materials are formed into any desired container cover shape, such as so-called crowns, pilfer-proof caps, screw caps and twist-off caps, and are used in the method of manufacturing of the present invention.

In the present invention, the thermoplastic resin used as the liner can be any desired thermoplastic resin capable of melt-forming and having cushionability as a liner. Thermoplastic resins particularly useful for the objects of the present invention are olefin resins, for example polyolefin, polypropylene, ethylene-propylene copolymer, ethylene-vinyl acetate copolymer, ethylene-ester acrylate copolymer and ionomers, used singly or in combinations of two or more, and other soft vinyl chloride resins can also be used.

Thermoplastic resins that are particularly useful for the objects of the present invention are low density polyethylene and ethylene copolymers, and form the standpoints of liner properties and prevention of orientation, substances should be used that are blends in low density polyethylene of at least one of: (a) ethylene-propylene copolymer, and (b) thermoplastic elastomer, particularly ethylene-diene (butadiene or isoprene)-styrene block copolymer, and these enhancing ingredients should be contained in the low density polyethylene at 3 to 40 wt%.

In the present invention, in order not to impart an excessive degree of intrasurface orientation to the liner periphery, the olefin resin used should have a comparatively large melt flowability. In one form of the present invention, a low density polyethylene should be used where the melt index (M.I.) is in the range of 1.0 to 20 g/10 min., particularly 3 to 10 g/min. That is polyethylene having an M.I. smaller than the above range will have a great tendency for large surface orientation at the liner periphery during press-forming and stress cracking will occur easily. On the other hand, polyethylene having an M.I. larger than this range will have a tendency toward stress cracking under severe liner environmental conditions even where the intrasurface orientation is controlled in the outer periphery.

The thermoplastic resin used in the present invention may have compounding ingredients that are known, for example, white or colored pigments such as titanium white or carbon black, fillers such as calcium carbonate, white carbon or clay, antioxidants, lubricants, plasticizers, anti-static agents and heat stabilizers, all in blending ratios that are themselves known.

The amount of resin supplied to the container cover shell will vary depending on the size of the shell, but ordinarily it will be in the range of 100 mg to 10 g.

The present invention will be further explained by reference to the following examples.

EXAMPLE 1

A paint comprising 70 parts by weight of vinyl chloride-vinyl acetate copolymer, 25 parts by weight of bisphenol A type epoxy resin, 5 parts by weight of amino resin and an organic solvent was applied by roll coating onto a surface treated steel sheet 0.3 mm thick as an anti-rust undercoating lacquer. The sheet was then heated at 190° C. for 10 minutes. A primer composition comprising 70 parts by weight of epoxy resin, 10 parts by weight of urea resin, 20 parts by weight of maleic acid modified polyethylene and an organic solvent was applied by roll coating over the anti-rust undercoating as an adhesive paint and the sheet was heated at 200° C. for 10 minutes. The painted sheet was then formed into crown shells with the coated surface inside. The crown shells obtained were then heated at 150° C. in a high frequency heating apparatus. A low density polyethylene (melt index (M.I.) 3.0, density 0.92) which melted under the conditions shown in Table 1 was extruded from an extruder and cut by a rotary knife into molten resin pieces which were deposited into the insides of the heated crown shells. About 0.2 g was supplied for each crown, and the crowns were completed by pressing the molten low density polyethylene with a press based on the conditions in Table 1 to make the liner form. The liner shapes formed at this time are shown in FIGS. 1 and 2. The dimensions of the forms in the figures (in mm) were:

| | |
|---|---|
| depth of liner center flat part | 0.25 |
| diameter of liner center flat part | 19.0 |
| depth of inside ring-shaped projection | 1.0 |
| depth of outside ring-shaped projection | 1.0 |
| outer diameter of same | 25.0 |
| depth of ring-shaped concave channel | 0.35 |
| diameter of same | 21.5 |

The liner forming conditions are given in Table 1.

The following tests and evaluations were made of the various crowns described above.

Test (1): Intrasurface orientation index and balance degree difference.

Each type of crown liner was peeled, and the molecular orientation coefficients 1 (radial direction) and m (peripheral direction) were obtained by a polarized fluorescence method (FOM) for the center parts and the outer peripheral parts of the peeled liner (the parts contacting the ring-shaped projections on the side near the crown centers).

Then evaluations of the lined crowns were made using bottles as specified in JIS S-9017.

Test (2): Peeling strength. The peeling strength between crown and liner was measured (peeling speed 50 mm/minute, temperature 20° C., peeling angle 90°, tension tensile tester).

Test (3): Instantaneous pressure. Instantaneous pressure tests were done based on JIS S-9017.

Test (4): Stress cracking resistance test. A 0.1% RIBONOKKUSU solution (Raion Yushi [Lion Fat & Oil Co., Ltd.]) as a crack promoter was held at 50° in a constant temperature water tank. Lined crowns, except for their pleats, were bent to an angle of 90° with the lined parts in front and immersed in the 0.1% RIBONOKKUSU solution, examined with a microscope, and the time it took for cracks to form in 50% of the samples (F50) was measured.

Test (5): Environmental heat resistance test.

(a) 40.5 g of concentrated sulfuric acid (98%) was thinned with 7.57 l. of water to make a dilute acid. 200 ml of this dilute acid was poured into bottles having a capacity of 210 ml. Then 3 g of sodium bicarbonate was wrapped in paper and placed in the bottles so that it did not touch the solution after which the bottles were capped. The sodium bicarbonate became completely dissolved. The bottles were then placed in water heated to 80° C. and held for one hour at 80° C., and the number of bottles showing gas leakage was investigated.

(b) Liner cracks were investigated for caps treated in the same manner as in (a) above.

(c) Liner cracks were investigated after the dilute acid and sodium bicarbonate were put in the bottles and they were capped in the same manner as in (a) above.

As shown in Table 2 and with reference to the results of Test (1) for intrasurface orientation index and balance degree depending on resin temperature, it is seen that, for Condition 1, Condition 2 and Comparative Example 1 that the higher the resin temperature at time of forming, the greater will be the decline in intrasurface orientation index and balance degree and the better the results of Tests (2) to (5). It is seen that for Conditions 1–4 and Comparative Example 2 and in view of the results of Tests (1) to (5) based on difference in resin temperature and difference in surface temperatures between the press and the anvil that the results based on resin temperature were the same as before and that the higher the resin temperature and the higher the surface temperatures of the press and the anvil, the greater the decline in the intrasurface orientation index and balance degree, the better the results of Tests (2) to (5). It is seen that for Condition 2, Condition 3, Condition 5 and Comparative Example 3, in view of the results of Tests (1) and (5) that the higher the shell temperature, the lower will be the intrasurface orientation index and balance degree, and that the results of Tests (2) to (5) were also good. Thus, low density polyethylene lined crowns made under conditions of resin temperature 230° C., shell temperature 180° C., press surface temperature 90° C. and anvil surface temperature 90° C. were improved in peeling strength, instantaneous pressure cracks and heat resistance.

TABLE 1

| Forming Conditions | Resin Temp. | Shell Temp. | Press Surface Temp. | Anvil Surface Temp. |
|---|---|---|---|---|
| 1 | 230° C. | 150° C. | 25° C. | 25° C. |
| 2 | 160° C. | 150° C. | 40° C. | 40° C. |
| 3 | 230° C. | 100° C. | 90° C. | 90° C. |
| 4 | 190° C. | 150° C. | 90° C. | 90° C. |
| 5 | 190° C., | 180° C. | 40° C. | 40° C. |
| Comparative Ex. 1 | 140° C. | 150° C. | 40° C. | 40° C. |
| Comparative Ex. 2 | 190° C. | 150° C. | 10° C. | 10° C. |
| Comparative Ex. 3 | 190° C. | 80° C. | 40° C. | 40° C. |

Note 1
The anvil supports the outside bottom surface of the shell when the resin is engaged by the press. (The same hereafter).

TABLE 2

| | Forming Conditions | | | | | | | |
|---|---|---|---|---|---|---|---|---|
| | Conditions of Present Invention | | | | | Comparative Examples | | |
| Items | 1 | 2 | 3 | 4 | 5 | 1 | 2 | 3 |
| Central part | | | | | | | | |
| Orientation | 0.010 | 0.025 | 0.008 | 0.03 | 0.02 | 0.18 | 0.14 | 0.16 |
| Coefficient $l/m$ | 0.010 | 0.015 | 0.002 | 0.01 | 0.01 | 0.17 | 0.07 | 0.14 |
| Orientation Index $I_o{}^C = l + m$ | 0.02 | 0.04 | 0.01 | 0.04 | 0.03 | 0.35 | 0.21 | 0.30 |
| Balance Degree $D_B{}^C = |l - m|$ | 0.00 | 0.01 | 0.006 | 0.02 | 0.01 | 0.01 | 0.07 | 0.02 |

TABLE 2-continued

| | Forming Conditions | | | | | | | |
|---|---|---|---|---|---|---|---|---|
| | Conditions of Present Invention | | | | | Comparative Examples | | |
| Items | 1 | 2 | 3 | 4 | 5 | 1 | 2 | 3 |
| Outer peripheral Part | | | | | | | | |
| Orientation | 0.165 | 0.275 | 0.123 | 0.19 | 0.21 | 0.68 | 0.535 | 0.65 |
| Coefficient $1/m$ | 0.005 | 0.025 | 0.007 | 0.04 | 0.02 | 0.18 | 0.095 | 0.18 |
| Orientation Index $I_o^P = 1 + m$ | 0.17 | 0.30 | 0.13 | 0.23 | 0.23 | 0.86 | 0.63 | 0.83 |
| Balance Degree $D_B^P = \|1 - m\|$ | 0.16 | 0.25 | 0.116 | 0.15 | 0.19 | 0.50 | 0.44 | 0.47 |
| $I_o^P - I_o^C$ | 0.15 | 0.26 | 0.12 | 0.19 | 0.20 | 0.51 | 0.42 | 0.53 |
| $D_B^P - D_B^C$ | 0.16 | 0.24 | 0.11 | 0.13 | 0.18 | 0.49 | 0.37 | 0.45 |
| Peeling Strength (Kg) | 4.05 | 2.84 | 4.66 | 3.64 | 3.72 | 0.12 | 0.36 | 0.05 |
| Instantaneous pressure test $\frac{kg}{cm^2}$ | >15 | >15 | >15 | >15 | >15 | 6 | 8 | 4 |
| F50 Stress Cracking Resistance Test (hours) | 3.8 | 3.5 | 4.0 | 3.7 | 3.7 | 0.3 | 0.5 | 0.2 |
| Environmental heat resistance test — Sealing test (bottles) | 0 | 0 | 0 | 0 | 0 | 19 | 16 | 20 |
| Cracks (heat treated) (bottles) | 0 | 0 | 0 | 0 | 0 | 10 | 4 | 10 |
| Cracks (untreated) (bottles) | 0 | 0 | 0 | 0 | 0 | 0 | 0 | 0 |

EXAMPLE 2

The same paints as in Example 1 were painted onto an aluminum sheet 0.25 mm thick (Furukawa Aruminiyumu Kogyo ]Furukawa Aluminum Industries], 5052) to make the coated sheet. Cap shells (28 mm diameter, 15.6 mm high) were then formed so that the coated surface was on the insides.

The cap shells thus obtained were heated with a high frequency heating apparatus at 140° C., and various types of polyethylene as shown in Table 3 were extruded from an extruder under conditions also shown in Table 3. Molten resin particles (0.4 g) were cut with a rotating knife and inserted onto the inside centers of the heated cap shells. The liner shapes were immediately formed by pressing with the press under conditions shown in Table 3, and various types of lined caps were thus made. The liner shapes formed at this time had the shapes shown in FIGS. 3 and 4 where the same identifying numerals are used to identify the same parts and where the caps included a slit 9 in the skirt 4. FIG. 2, Table 3 and Table 4 give the liner forming conditions and the details of the various polyethylenes used.

The following tests are evaluations were conducted for the various types of caps.

Test 1. Intrasurface orientation index difference ($I_o^P - I_o^C$) and balance degree difference ($D_B^P - D_B^C$).

The various types of caps had their liners peeled and the intrasurface orientation index differences ($I_o^P - I_o^C$) and balance degree difference ($D_B^P - D_B^C$) were obtained by the same method as in Example 1 for the peeled liners.

Figure 5:
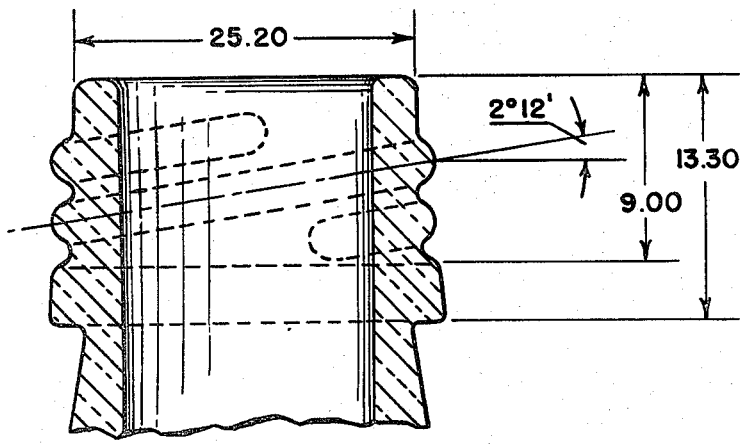
FIG. 5 is a sectional view of the mouth of a bottle used in tests outlined in Example 2.

Also, evaluations were carried out using a 130 ml capacity bottle having a bottle mouth of the measurements (in mm) shown in FIG. 5 for the various types of lined caps.

Test 2. Peeling strength.

The peeling strength between the liners and the caps were measured in the same manner as in Example 1.

Test 3. Instantaneous pressure test.

120 ml of water was placed into bottles having capacities of 130 ml and having bottle mouths as shown in FIG. 5 and the lined caps were capped on the bottles. Measurements were made using the instantaneous pressure measurement apparatus (Alcoa Company, Proper Application Tester 490) as shown in FIG. 6.

Figure 6:
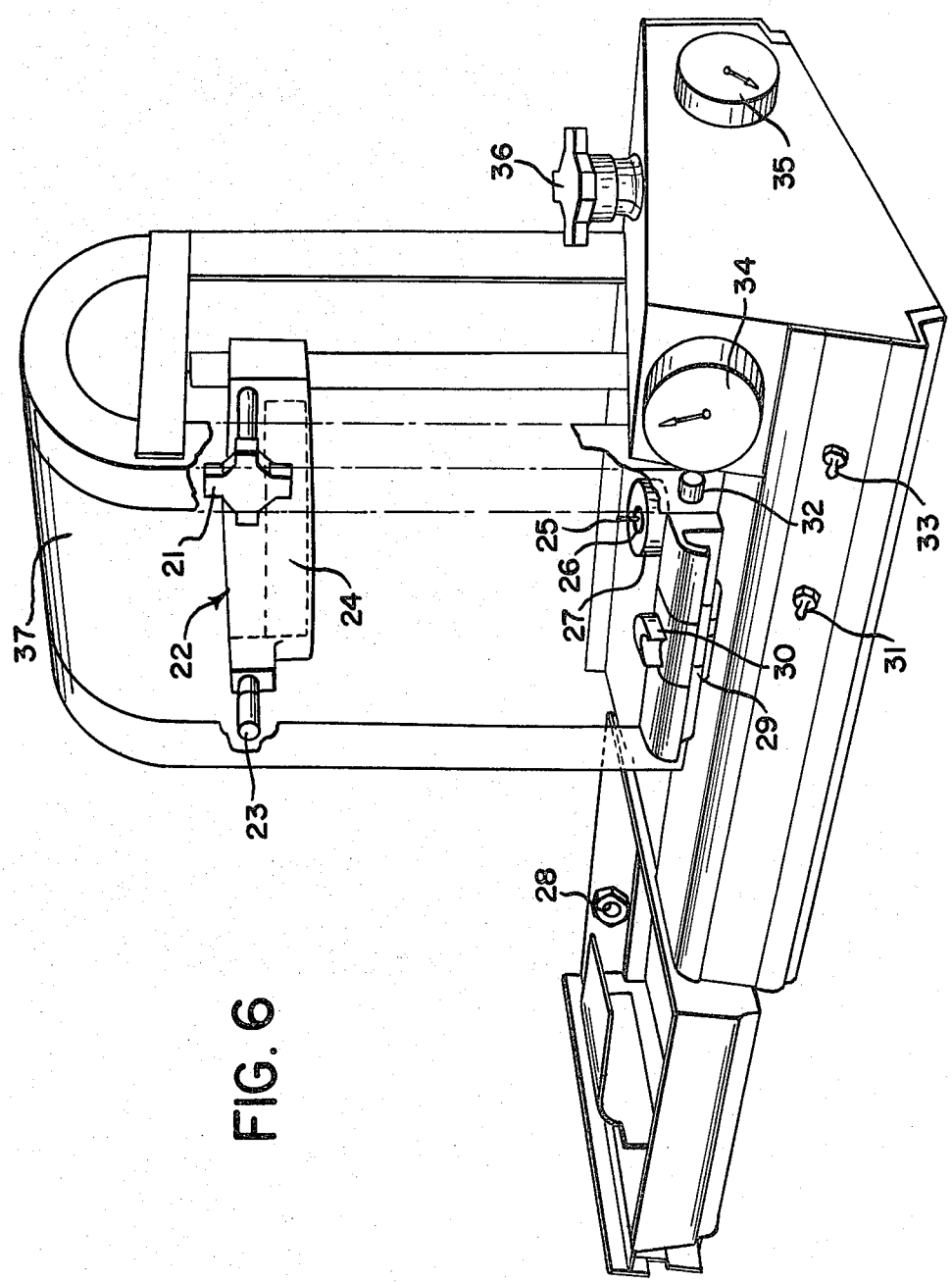
FIG. 6 is a perspective view of an instantaneous pressure tester utilized in the tests of Example 2.

Referring to FIG. 6, a bottle, not shown, capped with a lined cap is positioned in the instantaneous pressure measurement apparatus so that the top of the cap is pressed against an exhaust pin 25. Pin 25 pierces the liner and the cap contacts rubber packing 26. The bottle is supported by bottle support rod 23 and bottle support packing 24. The cover 37 is closed, covered fastener 30 is fastened, and the intake switch 34 then opened so that gas flows into the bottle via exhaust pin 25. The instantaneous pressure valve is read off bottle internal pressure meter 34. Other items of the apparatus include a bottle supporter attachment screw 21, a bottle supporter 22, a rubber packing 26, a pin holding stand 27, a water removal opening 28, a covered switch latch 29, a discharge air switch 31, a safety apparatus 32, a gas pressure meter 35 and a gas pressure regulation valve 36.

Test 4. Stress cracking resistance test.

Caps with the side surface screws removed were bent to angles of 90° under the same conditions as in Example 1 with the liner parts on the surface and immersed in a crack promoter (0.1% RIBONOKKUSU solution). The caps were then inspected with a microscope, and the time (F50) until cracks occurred in 50% of the samples was measured.

Test 5. Environmental heat resistance test.

(a) 40.5 g of concentrated sulfuric acid (98%) was thinned in 7.57 l. of water to make a dilute acid and 120 ml of this dilute acid was placed in bottles having capacities of 130 ml and having the bottle mouth shown in FIG. 5. Then 1.8 g of sodium bicarbonate was wrapped in paper, placed in the bottles so as not to touch the solution and after the bottles were capped, the sodium bicarbonate was completely dissolved. The number of bottles showing gas leakage was investigated with the bottles having been placed in warm water of 80° C. for one hour.

(b) Cracks in the liners were inspected for caps treated in the same manner as in (a).

(c) Cracks in the liners were investigated after dilute acid and sodium bicarbonate were put in the bottles and they were capped in the same manner as in (a).

As shown in Table 5, when lined caps prepared under the conditions of Condition 1 of the present invention and lined caps prepared under conditions of Condition 2 of the comparative example are compared as to intrasurface orientation index, balance degree, peeling strength, instantaneous pressure value, cracks and pressure resistance, the lined caps prepared under the conditions of Condition 1 (present invention) have lowered intrasurface orientation indexes and balance degrees. In addition their peeling strengths and instantaneous pressure values are raised, and in particular their resistance to cracks and heat are raised. Further, among the polyethylenes, those having the smallest melt indexes have the greatest tendency toward molecular orientation and conversely those with the largest melt indexes have little molecular orientation. Both tend toward occurrence of cracks.

TABLE 3

| Forming Conditions | Resin Temp. | Shell Temp. | Press Surface Temp. | Anvil Temp. |
|---|---|---|---|---|
| 1 (Present Invention) | 230° C. | 180° C. | 90° C. | 90° C. |
| 2 (Comparative Example) | 150° C. | 130° C. | 10° C. | 10° C. |

TABLE 4

| Sample Numbers | Melt Index (g/10 minutes) | Density (g/cc) |
|---|---|---|
| 1 | 0.2 | 0.922 |
| 2 | 2.0 | 0.918 |
| 3 | 10.0 | 0.917 |
| 4 | 20.0 | 0.916 |
| 5 | 32 | 0.920 |

TABLE 5

| Forming conditions | Sample Numbers | Center Part | | | | Outer Peripheral Part | | | |
|---|---|---|---|---|---|---|---|---|---|
| | | Orientation Coefficient | | Orientation Index | Balance Degree | Orientation Coefficient | | Orientation Index | Balance Degree |
| | | $l$ | $m$ | $I_o^C = l + m$ | $D_B^C = \|l - m\|$ | $l$ | $m$ | $I_o^P = l + m$ | $D_B^C = \|l - m\|$ |
| 1 Present Invention | 1 | 0.06 | 0.03 | 0.09 | 0.03 | 0.25 | 0.01 | 0.26 | 0.24 |
| | 2 | 0.04 | 0.03 | 0.07 | 0.01 | 0.195 | 0.005 | 0.20 | 0.19 |
| | 3 | 0.04 | 0.01 | 0.05 | 0.03 | 0.145 | 0.005 | 0.15 | 0.14 |
| | 4 | 0.03 | 0.02 | 0.05 | 0.01 | 0.14 | 0.00 | 0.14 | 0.14 |
| | 5 | 0.01 | 0.02 | 0.03 | 0.01 | 0.11 | 0.00 | 0.11 | 0.11 |
| 2 Comparative Example | 1 | 0.10 | 0.03 | 0.13 | 0.07 | 0.59 | 0.11 | 0.70 | 0.48 |
| | 2 | 0.08 | 0.03 | 0.11 | 0.05 | 0.55 | 0.07 | 0.62 | 0.48 |
| | 3 | 0.06 | 0.04 | 0.10 | 0.02 | 0.48 | 0.08 | 0.56 | 0.40 |
| | 4 | 0.05 | 0.03 | 0.08 | 0.02 | 0.425 | 0.065 | 0.49 | 0.36 |
| | 5 | 0.04 | 0.03 | 0.07 | 0.01 | 0.395 | 0.065 | 0.46 | 0.33 |

| Forming Condition | Sample Numbers | Intrasurface orientation Index Difference $I_o^P - I_o^C$ | Balance Degree $D_B^P - D_B^C$ | Peeling Strength (Kg) | Instantaneous Pressure Test $\frac{Kg}{cm^2}$ | Stress Cracking Resistance Test (hours) | Environmental Heat Resistance Test | | |
|---|---|---|---|---|---|---|---|---|---|
| | | | | | | | Sealability (bottles) | Heat Treatment Cracking (bottles) | Untreated Cracking (bottles) |
| 1 Present Invention | 1 | 0.17 | 0.21 | 3.50 | 9.5 | 2.5 | 1 | 1 | 0 |
| | 2 | 0.13 | 0.18 | 5.02 | >11 | 4.5 | 0 | 0 | 0 |
| | 3 | 0.10 | 0.11 | 4.73 | >11 | 6.5 | 0 | 0 | 0 |
| | 4 | 0.09 | 0.13 | 4.17 | >11 | 4.0 | 1 | 1 | 0 |
| | 5 | 0.08 | 0.10 | 3.75 | 8.0 | 2.5 | 2 | 1 | 0 |
| 2 Comparative Example | 1 | 0.57 | 0.41 | 0.21 | 3.5 | 0.1 | 11 | 1 | 1 |
| | 2 | 0.51 | 0.43 | 0.25 | 4.7 | 0.5 | 14 | 3 | 1 |
| | 3 | 0.46 | 0.38 | 0.34 | 5.5 | 0.5 | 16 | 7 | 0 |
| | 4 | 0.41 | 0.34 | 0.58 | 6.3 | 0.1 | 20 | 10 | 0 |
| | 5 | 0.59 | 0.35 | 0.28 | 3.8 | 0.2 | 20 | 7 | 1 | coated sheet, caps with polyvinyl chloride liners were prepared in the same manner as before.

The various types of thermoplastic resin liners in Table 7 were formed in the above cap shells under the forming conditions of Table 6 and by the same method as in Example 2. However, cap shells having the several polypropylene coatings and polyvinyl chloride coatings were used in making the polypropylene liners and polyvinyl chloride liners. Also, the blended resins Nos. 5–14 among the samples of materials shown in Table 7 were melt-blended with a commonly used kneader and previously made into uniformly dispersed pellets.

Figure 3:
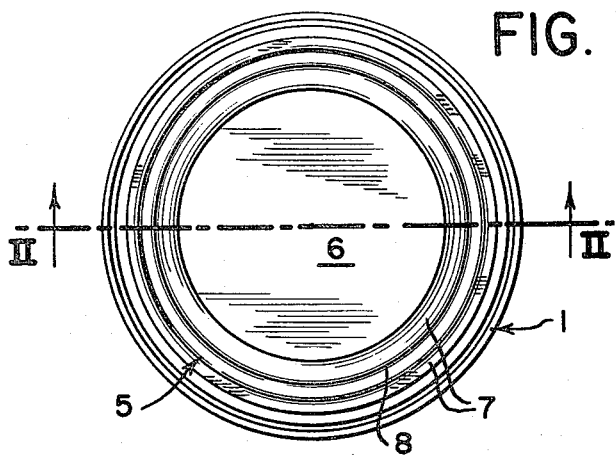
FIG. 3 is a plan view of a pilfer-proof cap constructed according to the invention.
Figure 4:
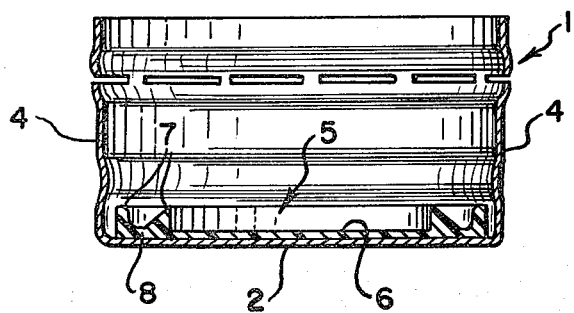
FIG. 4 is a sectional view of the cap of FIG. 3 taken along lines II—II.

The shapes of the said several types of liners are as shown in FIGS. 3 and 4.

Tests were carried out on each type of the lined caps with the same tests as in Example 2, and the results are shown in Table 8. According to these results, caps formed under Forming Condition 2, offered as a comparative example, show marked molecular orientation in their outer peripheral vicinities, and because of this, even though the lined caps were made of blended elastic polymers, their properties were not sufficient for practical use. It is believed that this marked molecular orientation is a result of the glass bottle mouth being set in between the two projections (two rings) furnished along the outer periphery of the liner and that the rings received a partial elongation stress such that the molecular orientation in this part was repeated resulting in the decline in practical characteristics and cracking in the tests.

On the other hand, lined caps having the molecular orientation suppressed to a fixed limit by the forming processing conditions had very superior practical properties. Particularly, the ethylene-propylene copolymer and the styrene-diene-styrene block copolymer showed marked effect in stopping molecular orientation and in improving every type of property.

EXAMPLE 3

Cap shells were made by the same method as in Example 2. Also, an aluminum sheet identical to that in Example 2 was roll coated with vinyl-phenol paint as a polyvinyl chloride liner and heating was done at 190° C. for 10 minutes. Also, instead of the modified polyethylene paint of Example 1, a maleic acid modified polypropylene was used as a polypropylene liner. Using this

TABLE 6

| Forming Conditions | Resin Temp. | Shell Temp. | Press Surface Temp. | Anvil Surface Temp. |
|---|---|---|---|---|
| | | | | Units : °C. |
| 1 (Present Invention) | 230 | 180 | 90 | 120 |
| 2 (Comparative Example) | 190 | 140 | 10 | 10 |

TABLE 7

| Sample Number | Resin Composition |
|---|---|
| 1 | PP |
| 2 | EVA |
| 3 | PVC |
| 4 | LDPE |
| 5 | LDPE (90) - PIB (10) |
| 6 | LDPE (90) - EP (10) |
| 7 | LDPE (70) - EP (30) |
| 8 | LDPE (90) - PB (10) |
| 9 | LDPE (90) - SIS (10) |
| 10 | LDPE (90) - SBS (10) |
| 11 | LDPE (70) - EP (20) - SIS (10) |
| 12 | LDPE (70) - EP (20) - SBS (10) |
| 13 | HDPE (70) - PE (30) |
| 14 | HDPE (90) - eva' (10) |

(Note)
values in parenthesis show weight ratios of the compositions.
PP-polypropylene (MI = 25, density 0.91)
EVA-ethylene-vinyl acetate copolymer (vinyl acetate 19%, MI = 2.5)
PVC-soft polyvinyl chloride comprising 100 parts by weight of polyvinyl chloride, 60 parts of a plasticizer (DOP) and 2 parts of a heat stabilizer
LDPE-polyethylene (density 0.921, MI = 2.7)
PIB-polyisobutylene rubber (BISTANEKKUSU LLM-100, Esso Chemical)
EP-ethylene-propylene copolymer (propylene 26%, MI = 2.6)
SIS-styrene-isoprene-styrene block copolymer (Califlux TR-1107, Shell Chemical)
SBS-styrene-butadiene-styrene block copolymer (Califlux TR-1102, Shell Chemical)
PE-polyester elastomer (PERUPUREN P 70B, Toyo Boseki [Toyo Spinning Co., Ltd.])
EVA'-ethylene-vinyl acetate copolymer (vinyl acetate 60%, MI = 40)
PB-1,2-polybutadiene (RB-820, Nippon Gosei Gomu [Nippon Synthetic Rubber])
HDPE--high density polyethylene (density 0.960, MI = 4.0)

TABLE 8

| Forming Conditions | | Central Part | | | | Outer Peripheral Part | | | |
|---|---|---|---|---|---|---|---|---|---|
| | | Orientation Coefficient | | Orientation Index | Balance Degree | Orientation Coefficient | | Orientation Index | Balance Degree |
| | | $l$ | $m$ | $I_o^C = l + m$ | $D_B^C = |l - m|$ | $l$ | $m$ | $I_o^P = l + m$ | $D_B^P = |l - m|$ |
| 1 Present Invention) | 1 | 0.10 | 0.03 | 0.13 | 0.07 | 0.39 | 0.04 | 0.43 | 0.35 |
| | 2 | 0.05 | 0.02 | 0.07 | 0.03 | 0.06 | 0.02 | 0.08 | 0.04 |
| | 3 | 0.032 | 0.025 | 0.057 | 0.007 | 0.037 | 0.023 | 0.06 | 0.014 |
| | 4 | 0.07 | 0.02 | 0.09 | 0.05 | 0.165 | 0.025 | 0.19 | 0.14 |
| | 5 | 0.04 | 0.03 | 0.07 | 0.01 | 0.125 | 0.025 | 0.15 | 0.10 |
| | 6 | 0.04 | 0.02 | 0.06 | 0.02 | 0.05 | 0.02 | 0.07 | 0.03 |
| | 7 | 0.02 | 0.016 | 0.036 | 0.004 | 0.025 | 0.015 | 0.04 | 0.01 |
| | 8 | 0.05 | 0.02 | 0.06 | 0.04 | 0.135 | 0.015 | 0.15 | 0.12 |
| | 9 | 0.03 | 0.01 | 0.04 | 0.02 | 0.04 | 0.01 | 0.05 | 0.03 |
| | 10 | 0.03 | 0.02 | 0.05 | 0.01 | 0.04 | 0.02 | 0.06 | 0.02 |
| | 11 | 0.010 | 0.002 | 0.012 | 0.008 | 0.0165 | 0.0035 | 0.02 | 0.013 |
| | 12 | 0.008 | 0.004 | 0.012 | 0.004 | 0.013 | 0.002 | 0.015 | 0.011 |
| | 13 | 0.06 | 0.04 | 0.10 | 0.02 | 0.175 | 0.045 | 0.22 | 0.13 |
| | 14 | 0.08 | 0.05 | 0.13 | 0.03 | 0.20 | 0.06 | 0.26 | 0.14 |
| 2 Comparative Example | 1 | 0.12 | 0.04 | 0.16 | 0.08 | 0.65 | 0.09 | 0.74 | 0.56 |
| | 2 | 0.10 | 0.03 | 0.13 | 0.07 | 0.47 | 0.05 | 0.52 | 0.42 |
| | 3 | 0.08 | 0.04 | 0.12 | 0.04 | 0.40 | 0.05 | 0.45 | 0.35 |
| | 4 | 0.14 | 0.07 | 0.21 | 0.07 | 0.535 | 0.095 | 0.63 | 0.44 |
| | 5 | 0.12 | 0.03 | 0.15 | 0.09 | 0.52 | 0.05 | 0.57 | 0.47 |
| | 6 | 0.10 | 0.03 | 0.13 | 0.07 | 0.455 | 0.055 | 0.51 | 0.40 |
| | 7 | 0.12 | 0.02 | 0.14 | 0.10 | 0.46 | 0.04 | 0.50 | 0.42 |
| | 8 | 0.18 | 0.05 | 0.23 | 0.13 | 0.585 | 0.055 | 0.64 | 0.49 |
| | 9 | 0.09 | 0.03 | 0.12 | 0.06 | 0.435 | 0.055 | 0.49 | 0.38 |
| | 10 | 0.09 | 0.02 | 0.11 | 0.07 | 0.44 | 0.04 | 0.48 | 0.40 |
| | 11 | 0.07 | 0.04 | 0.11 | 0.03 | 0.39 | 0.05 | 0.44 | 0.34 |
| | 12 | 0.09 | 0.04 | 0.13 | 0.05 | 0.42 | 0.05 | 0.47 | 0.37 |
| | 13 | 0.10 | 0.05 | 0.15 | 0.05 | 0.55 | 0.07 | 0.62 | 0.48 |
| | 14 | 0.09 | 0.07 | 0.16 | 0.02 | 0.555 | 0.085 | 0.64 | 0.47 |

| Forming Conditions | | Intrasurface Orientation Index Difference $I_o^P - I_o^C$ | Balance Degree Difference $D_B^P - D_B^C$ | Peeling Strength (Kg) | Instantaneous Pressure Test $\frac{kg}{cm^2}$ | Stress Cracking Resistance F50 Test | Environmental Heat Resistance Test | | |
|---|---|---|---|---|---|---|---|---|---|
| | | | | | | | Sealing Test (bottles) | Cracking (untreated) (bottles) | Cracking (Treated) (bottles) |
| 1 Present Invention | 1 | 0.30 | 0.28 | 4.05 | 11 | >48 | 1 | 0 | 0 |
| | 2 | 0.01 | 0.01 | 6.88 | >11 | >48 | 5 | 0 | 0 |
| | 3 | <0.01 | <0.01 | 7.08 | >11 | >48 | 0 | 0 | 0 |
| | 4 | 0.10 | 0.09 | 4.73 | >11 | >48 | 0 | 0 | 0 |
| | 5 | 0.08 | 0.09 | 3.47 | >11 | >48 | 0 | 0 | 0 |
| | 6 | 0.01 | 0.01 | 7.54 | >11 | >48 | 0 | 0 | 0 |
| | 7 | <0.01 | <0.01 | 7.63 | >11 | >48 | 0 | 0 | 0 |
| | 8 | 0.09 | 0.08 | 3.88 | >11 | >48 | 0 | 0 | 0 |
| | 9 | 0.01 | 0.01 | 7.16 | >11 | >48 | 0 | 0 | 0 |
| | 10 | 0.01 | 0.01 | 7.05 | >11 | >48 | 0 | 0 | 0 |
| | 11 | <0.01 | <0.01 | 7.71 | >11 | >48 | 0 | 0 | 0 |
| | 12 | <0.01 | <0.01 | 7.33 | >11 | >48 | 0 | 0 | 0 |
| | 13 | 0.12 | 0.11 | 3.11 | >11 | >48 | 0 | 0 | 0 |
| | 14 | 0.13 | 0.11 | 4.25 | >11 | >48 | 0 | 0 | 0 |
| | 1 | 0.58 | 0.48 | 0.15 | 3.5 | 30 | 20 | 0 | 0 |

TABLE 8-continued

|   |   | | | | | | | | |
|---|---|---|---|---|---|---|---|---|---|
| | 2 | 0.39 | 0.35 | 1.17 | 8.4 | 1.5 | 20 | 1 | 0 |
| | 3 | 0.33 | 0.31 | 0.27 | 7.8 | 20 | 15 | 0 | 0 |
| | 4 | 0.42 | 0.37 | 0.36 | 7.5 | 0.5 | 18 | 5 | 0 |
| | 5 | 0.42 | 0.38 | 0.25 | 5.3 | 0.8 | 18 | 5 | 0 |
| | 6 | 0.38 | 0.33 | 0.78 | 8.0 | 1.0 | 10 | 1 | 0 |
| 2 | 7 | 0.36 | 0.32 | 0.85 | 8.3 | 1.2 | 8 | 1 | 0 |
| Comparative | 8 | 0.41 | 0.40 | 0.22 | 4.8 | 0.4 | 20 | 6 | 0 |
| Example | 9 | 0.37 | 0.32 | 0.70 | 7.7 | 1.1 | 12 | 1 | 0 |
| | 10 | 0.37 | 0.33 | 0.68 | 7.5 | 0.9 | 13 | 1 | 0 |
| | 11 | 0.33 | 0.31 | 0.88 | 8.9 | 1.2 | 6 | 0 | 0 |
| | 12 | 0.34 | 0.32 | 0.84 | 8.5 | 1.2 | 7 | 1 | 0 |
| | 13 | 0.47 | 0.43 | 0.20 | 4.2 | 0.5 | 17 | 6 | 0 |
| | 14 | 0.48 | 0.45 | 0.18 | 3.9 | 0.5 | 18 | 7 | 0 |

EXAMPLE 4

Figure 7:
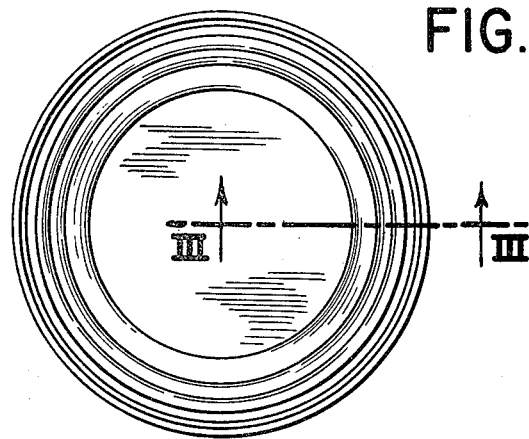
FIG. 7 is a plan view of a cap used in the test outlined in Example 4.
Figure 8:
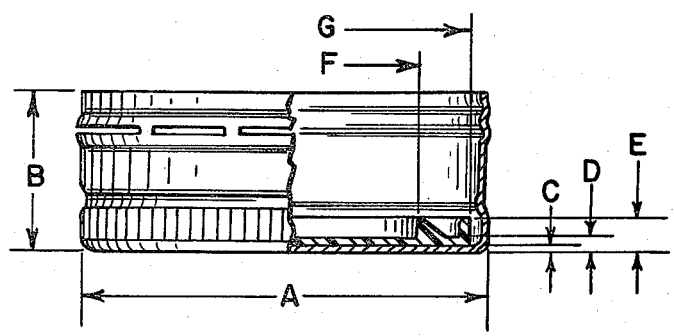
FIG. 8 is a partial side sectional view of the cap of FIG. 7 taken along lines III—III.

Coated sheets were prepared using the same aluminum sheet as in Example 2 and the same coatings as in Example 1. Then various sizes of cap shells having coated surfaces on the inside were formed by ordinary methods as shown in FIG. 7, FIG. 8, Table 11 and Table 12. The various types of cap shells thus obtained were heated with the same heating apparatus as in Example 2 under conditions shown in Table 9. Then molten blended resin pieces (65 parts by weight polyethylene (density 0.920, MI=1.5 25 parts by weight ethylene-propylene copolymer (propylene 9%), 10 parts by weight styrene-butadienestyrene, 0.01 parts by weight stearic acid amide and 6 parts by weight titanium white, uniformly dispersed in the resin)) were supplied to the inside of each heated cap shell by the same method as in Example 2 and under the conditions shown in Table 10 and the various lined caps were prepared by the same method as in Example 2 based on the conditions shown in Table 9. The liner shapes formed at this time are as shown in FIGS. 7 and 8 and in Table 11. Further, Table 9 and Table 10 respectively show the details of the liner forming conditions and the molten resin supply amounts for each type of cap.

Figure 9:
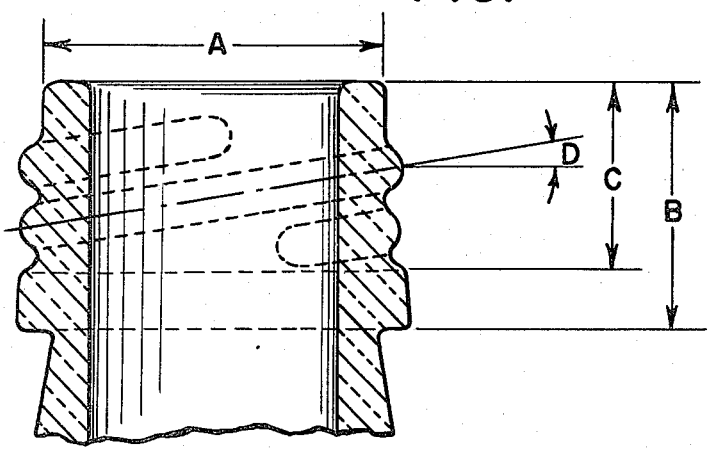
FIG. 9 is a sectional view illustrating the dimensions of the mouth of a bottle used in the tests of Example 4; and, FIGS. 10A, 10B and 10C are diagrammatical sketches illustrating steps in the press forming of a liner according to the invention.

The same types of tests and evaluations as in Example 2 were carried out using bottles having bottle mouths shown in FIG. 9 and in Table 12, for each of the said cap types. The bottle capacities were 100 ml for 16 mm, 100 ml for 18 mm, the same as in Example 2 for 28 mm, 250 ml for 38 mm, 300 ml for 63 mm and 500 ml for 82 mm.

The test results are as shown in Table 13. These results show that as the cap diameters become large, and the molten resin piece is placed in the center of the inside of the cap shell, the greater is the magnification of the expansion from the press and the more marked the molecular orientation. For this reason, the effects of the present invention will be greater the larger the cap.

TABLE 9

| Forming Conditions | Resin Temp. | Shell Temp. | Press Surface Temp. | Anvil Surface Temp. |
|---|---|---|---|---|
| | | | Units : °C. | |
| 1 (Present Invention) | 220 | 160 | 100 | 100 |
| 2 (Comparative Example) | 140 | 120 | 15 | 15 |

TABLE 10

| Cap Name | Resin Supply Amount |
|---|---|
| 1 6 mm | 0.15 g |
| 1 8 mm | 0.2 g |
| 2 8 mm | 0.4 g |
| 3 8 mm | 0.7 g |
| 6 3 mm | 2.0 g |
| 8 2 mm | 5.0 g |

TABLE 11

| | Cap Name | | | | | |
|---|---|---|---|---|---|---|
| | 1 6 mm | 1 8 mm | 2 8 mm | 3 8 mm | 6 3 mm | 8 2 mm |
| A (mm) | 16.4 | 18.4 | 28.4 | 38.3 | 63.9 | 82.8 |
| B | 11.6 | 12.45 | 15.6 | 16.75 | 18.25 | 19.15 |
| C | 0.2 | 0.2 | 0.2 | 0.2 | 0.2 | 0.2 |
| D | 0.3 | 0.3 | 0.3 | 0.3 | 0.4 | 0.4 |
| E | 1.4 | 1.4 | 1.6 | 1.6 | 1.8 | 2.0 |
| F | 11.5 | 12.5 | 18.5 | 27.4 | 52.0 | 68.9 |
| G | 14.5 | 16.5 | 26.5 | 36.4 | 62.0 | 80.9 |

TABLE 12

| Cap Name | Bottle Measurements | | | Screw Angle |
|---|---|---|---|---|
| | a (mm) | b (mm) | c (mm) | d (degrees) |
| 1 6 mm | 14.85 | 8.25 | 5.45 | 2° 5 8' |
| 1 8 mm | 15.90 | 10.35 | 6.25 | 2° 4 3' |
| 2 8 mm | 25.20 | 13.30 | 9.00 | 2° 1 2' |
| 3 8 mm | 34.95 | 13.45 | 10.05 | 1° 3 6' |
| 6 3 mm | 58.75 | 13.85 | 10.45 | 1° 2 2' |
| 8 2 mm | 75.95 | 14.25 | 10.95 | 1° 1 3' |

TABLE 13

| Forming Conditions | Cap Name | Central Part | | | | Outer Peripheral Part | | | |
|---|---|---|---|---|---|---|---|---|---|
| | | Orientation Coefficient | | Orientation Index | Balance Degree | Orientation Coefficient | | Orientation Index | Balance Degree |
| | | l | m | $I_o^C = l + m$ | $D_B^C = |l - m|$ | l | m | $I_o^P = l + m$ | $D_B^P = |l - m|$ |
| 1 Present Invention | 16 mm | 0.0007 | 0.0003 | 0.001 | 0.0004 | 0.0027 | 0.0003 | 0.003 | 0.0024 |
| | 18 mm | 0.0008 | 0.0002 | 0.001 | 0.0006 | 0.0033 | 0.0007 | 0.004 | 0.0026 |
| | 28 mm | 0.002 | 0.001 | 0.003 | 0.001 | 0.0125 | 0.0005 | 0.013 | 0.012 |
| | 38 mm | 0.004 | 0.002 | 0.006 | 0.002 | 0.064 | 0.012 | 0.076 | 0.052 |
| | 63 mm | 0.025 | 0.005 | 0.03 | 0.02 | 0.12 | 0.01 | 0.13 | 0.11 |
| | 82 mm | 0.10 | 0.02 | 0.12 | 0.08 | 0.425 | 0.055 | 0.48 | 0.37 |
| 2 Comparative | 16 mm | 0.13 | 0.03 | 0.16 | 0.10 | 0.495 | 0.075 | 0.57 | 0.42 |
| | 18 mm | 0.15 | 0.02 | 0.17 | 0.13 | 0.54 | 0.06 | 0.60 | 0.48 |
| | 28 mm | 0.16 | 0.01 | 0.17 | 0.15 | 0.595 | 0.045 | 0.64 | 0.055 |

TABLE 13-continued

| Forming Conditions | Cap Name | $I_o^P - I_o^C$ | | $D_B^P - D_B^C$ | Peeling Strength (Kg) | Instantaneous Pressure Test $\left(\frac{kg}{cm^2}\right)$ | Stress Cracking Resistance Test (Hours) | Environmental Heat Resistance Test | | |
|---|---|---|---|---|---|---|---|---|---|---|
| | | | | | | | | Sealability (Bottles) | Heat Treatment Cracking (Bottles) | Untreated Cracking (Bottles) |
| Example | 38 mm | 0.16 | 0.02 | 0.18 | 0.14 | 0.67 | 0.06 | 0.73 | | 0.61 |
| | 63 mm | 0.17 | 0.01 | 0.18 | 0.16 | 0.785 | 0.055 | 0.84 | | 0.73 |
| | 82 mm | 0.11 | 0.02 | 0.13 | 0.09 | 0.935 | 0.055 | 0.99 | | 0.88 |
| 1 Present Invention | 16 mm | 0.002 | | 0.002 | 4.51 | >11 | >48 | 0 | 0 | 0 |
| | 18 mm | 0.003 | | 0.02 | 5.93 | >11 | >48 | 0 | 0 | 0 |
| | 38 mm | 0.01 | | 0.011 | 7.31 | >11 | >48 | 0 | 0 | 0 |
| | 38 mm | 0.07 | | 0.05 | 5.81 | >11 | >48 | 0 | 0 | 0 |
| | 63 mm | 0.20 | | 0.18 | 4.52 | >11 | >48 | 0 | 0 | 0 |
| | 82 mm | 0.36 | | 0.29 | 4.13 | >11 | >48 | 0 | 0 | 0 |
| 2 Comparative Example | 16 mm | 0.41 | | 0.32 | 0.59 | 8.5 | 1.4 | 3 | 1 | 0 |
| | 18 mm | 0.43 | | 0.35 | 0.67 | 8.2 | 1.5 | 6 | 2 | 0 |
| | 28 mm | 0.47 | | 0.40 | 0.65 | 8.0 | 1.2 | 10 | 2 | 0 |
| | 38 mm | 0.55 | | 0.47 | 0.41 | 6.7 | 0.9 | 15 | 3 | 1 |
| | 63 mm | 0.66 | | 0.57 | 0.39 | 4.5 | 0.9 | 20 | 5 | 1 |
| | 82 mm | 0.86 | | 0.79 | 0.31 | 2.3 | 0.5 | 20 | 6 | 2 |

We claim:

1. A vessel closure which comprises an aluminum shell, the inner face of which is lined with an olefin resin which has been press-molded in situ onto said inner face, the difference ($I_o^P - I_o^C$) between the in-plane orientation index ($I_o^P$) of the peripheral portion of the press-molded olefin resin liner and the in-plane orientation index ($I_o^C$) of the central portion of the press-molded olefin resin liner being less than 0.37, said in-plane orientation index ($I_o$) being represented by the following formula:

$$I_o = l + m$$

wherein l represents the orientation coefficient in the radial direction of the liner and m represents the orientation coefficient in the circumferential direction of the liner.

2. A vessel closure according to claim 1 wherein the difference ($D_B^P - D_B^C$) between the degree of balance in the peripheral portion of the liner ($D_B^P$) and the degree of balance in the central portion of the liner ($D_B^C$) is less than 0.3, said degree of balance ($D_B$) being represented by the formula:

$$D_B = |l - m|.$$

3. The closure of claim 1 wherein said liner has ring-shaped projections adapted to seal on the peripheral open end part of a container and wherein said projections are 2 to 20 times the thickness of the central portion of the liner.

4. The closure of claim 1 wherein said olefin resin compises a composition containing a low density polyethylene and at least one enhancing ingredient selected from a group consisting of an ethylenepropylene copolymer and a styrene-diene-styrene block copolymer in amounts of 3–40 wt% of the low density polyethylene.

5. The closure of claim 1 wherein said olefin resin comprises a low density polyethylene having a melt index of 1.0 to 20 g/10 minutes.

* * * * *